(12) United States Patent
Moriya

(10) Patent No.: US 12,549,642 B2
(45) Date of Patent: Feb. 10, 2026

(54) SYSTEM, INFORMATION PROCESSING METHOD, AND STORAGE MEDIUM

(71) Applicant: CANON KABUSHIKI KAISHA, Tokyo (JP)

(72) Inventor: Akihiro Moriya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 18/158,296

(22) Filed: Jan. 23, 2023

(65) Prior Publication Data

US 2023/0247104 A1    Aug. 3, 2023

(30) Foreign Application Priority Data

Jan. 31, 2022    (JP) ................................ 2022-012595

(51) Int. Cl.
*H04L 67/55* (2022.01)
*H04L 12/28* (2006.01)
*H04L 67/52* (2022.01)
*H04W 4/021* (2018.01)

(52) U.S. Cl.
CPC .......... *H04L 67/55* (2022.05); *H04L 12/2823* (2013.01); *H04L 67/52* (2022.05); *H04W 4/021* (2013.01)

(58) Field of Classification Search
CPC ..... H04W 4/021; H04W 4/022; H04W 4/023; H04W 4/024; H04W 4/025; H04W 4/029; H04L 12/2823; H04L 67/52; H04L 67/53; H04L 67/54; H04L 67/55
USPC ...................................................... 455/404.2
See application file for complete search history.

(56) References Cited

U.S. PATENT DOCUMENTS

| | | | | |
|---|---|---|---|---|
| 5,414,759 | A * | 5/1995 | Ishikuri | H04Q 3/625 379/88.19 |
| 5,585,839 | A * | 12/1996 | Ishida | H04M 3/567 348/14.09 |
| 6,081,619 | A * | 6/2000 | Hashimoto | G06V 40/20 250/342 |
| 10,506,054 | B2 * | 12/2019 | Grohman | H04L 12/4625 |
| 10,515,343 | B1 * | 12/2019 | Kim | G06Q 10/1091 |
| 12,282,307 | B1 * | 4/2025 | Ross, Jr. | G08C 17/02 |
| 2003/0006912 | A1 * | 1/2003 | Brescia | H04L 67/52 340/531 |

(Continued)

FOREIGN PATENT DOCUMENTS

| | | |
|---|---|---|
| EP | 1276336 A2 | 1/2003 |
| EP | 3571826 A1 | 11/2019 |

(Continued)

OTHER PUBLICATIONS

Fulvio Corno, et al., "A Context and User Aware Smart Notification System", 2015 IEEE 2nd World Forum on Internet of Things, Dec. 14, 2015, pp. 645-651, XP32854136.

*Primary Examiner* — Jean A Gelin
(74) *Attorney, Agent, or Firm* — Canon U.S.A., Inc., IP Division

(57) ABSTRACT

A user's time and effort in making settings about information transmission from devices is reduced. An information processing method includes receiving information from a device, transmitting the received information to an information terminal of a user, detecting an attendance state of the user, and determining whether to issue a notification of the information based on the detected attendance state of the user.

15 Claims, 22 Drawing Sheets

(56) References Cited

U.S. PATENT DOCUMENTS

| | | | |
|---|---|---|---|
| 2004/0104806 A1* | 6/2004 | Yui | G08C 17/02 340/5.74 |
| 2006/0035205 A1* | 2/2006 | Dobson | G07C 9/28 434/350 |
| 2006/0265483 A1* | 11/2006 | Wang | G06F 9/5055 709/223 |
| 2014/0067649 A1 | 3/2014 | Kannan | |
| 2015/0286388 A1 | 10/2015 | Jeon | |
| 2017/0301039 A1* | 10/2017 | Dyer | G06Q 10/063114 |
| 2018/0146343 A1* | 5/2018 | Lee | A63F 13/35 |
| 2019/0228379 A1* | 7/2019 | Shimada | G06Q 10/10 |
| 2019/0301888 A1* | 10/2019 | Gürel | G01C 21/3611 |
| 2020/0126325 A1* | 4/2020 | Jeon | G07C 5/0866 |
| 2020/0182995 A1* | 6/2020 | Zeng | G01S 13/003 |
| 2020/0341529 A1* | 10/2020 | Kaipu Narahari | G05B 15/02 |
| 2021/0327184 A1* | 10/2021 | Mathur | G07C 9/00904 |
| 2021/0400056 A1* | 12/2021 | Klösters | H04L 63/123 |
| 2023/0328148 A1* | 10/2023 | Aruga | G06Q 10/10 709/217 |
| 2024/0292167 A1* | 8/2024 | Nesfield | H04R 27/00 |

FOREIGN PATENT DOCUMENTS

| | | |
|---|---|---|
| JP | H07222269 A | 8/1995 |
| JP | 2004013580 A | 1/2004 |
| JP | 2018156219 A | 10/2018 |
| WO | 2014017398 A1 | 1/2014 |
| WO | 2019196704 A1 | 10/2019 |
| WO | 2020017051 A1 | 1/2020 |

\* cited by examiner

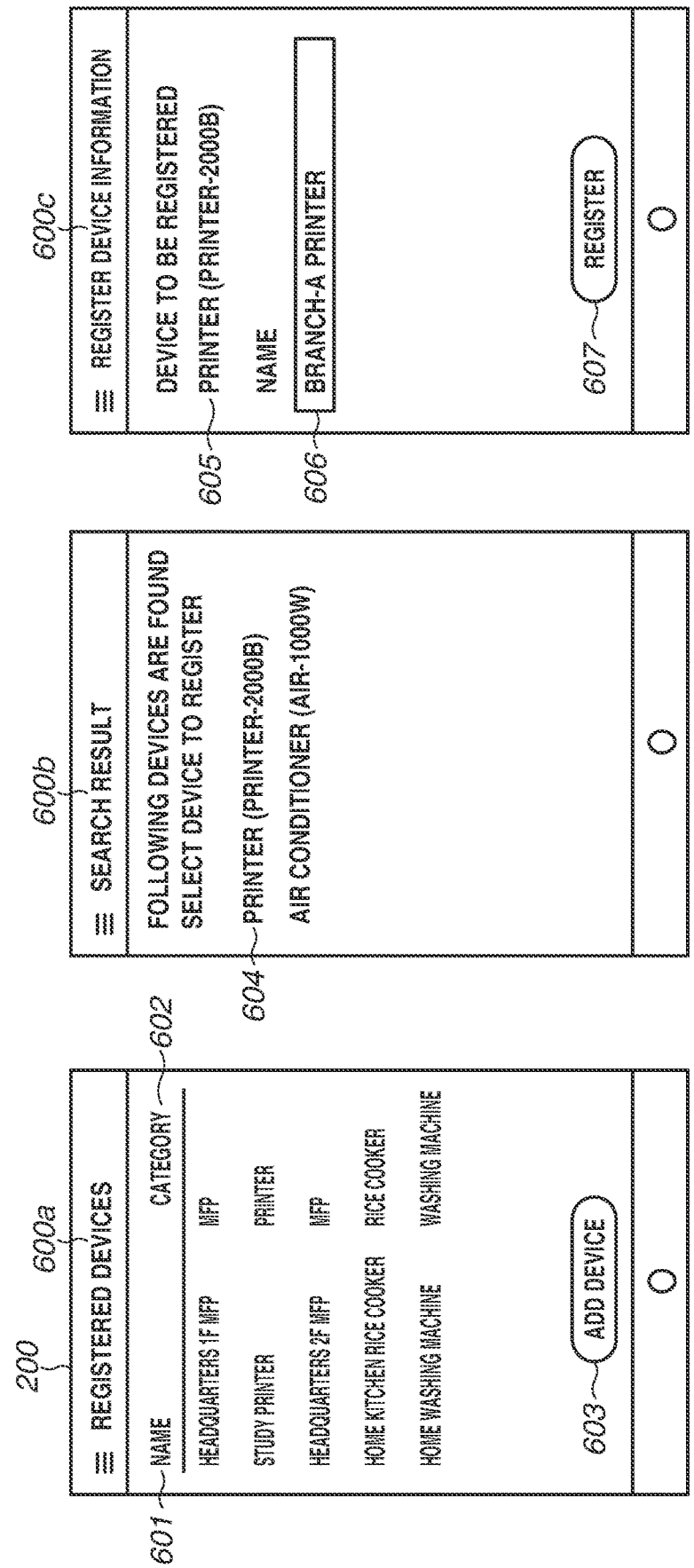

FIG.7

DEVICE GROUPS (700a, 200)

| NAME (701) | GROUP (702) |
|---|---|
| HEADQUARTERS 1F MFP | HEADQUARTERS PRINTER |
| STUDY PRINTER | NO GROUP |
| HEADQUARTERS 2F MFP | HEADQUARTERS PRINTER |
| HOME KITCHEN RICE COOKER | NO GROUP |
| HOME WASHING MACHINE | NO GROUP |
| BRANCH-A PRINTER | NO GROUP |

( REGISTER NEW GROUP ) — 703

---

REGISTER NEW GROUP (700b)

GROUP NAME
704 — [ HOME APPLIANCES ]

705 — CONNECTED DEVICES

| | |
|---|---|
| HEADQUARTERS 1F MFP | ☐ — 706 |
| STUDY PRINTER | ☑ |
| HEADQUARTERS 2F MFP | ☐ |
| HOME KITCHEN RICE COOKER | ☑ |
| HOME WASHING MACHINE | ☑ |

707 — ( REGISTER )

FIG.22

| DATE AND TIME OF ENTRY | WORK FORM | WORKPLACE (POSITION INFORMATION) | DATE AND TIME OF LEAVING |
|---|---|---|---|
| 2021/12/5 8:15 | TELECOMMUTING | LATITUDE: 35°33'58.9"N LONGITUDE: 139°40'59.0"E | 2021/12/5 8:15 |
| 2021/12/6 8:10 | AT OFFICE | LATITUDE: 35°54'22.4"N LONGITUDE: 140°03'16.7"E | 2021/12/6 8:10 |

2200    2201    2202    2203

SYSTEM, INFORMATION PROCESSING METHOD, AND STORAGE MEDIUM

BACKGROUND OF THE INVENTION

Field of the Invention

The present invention relates to a system, an information processing method, and a storage medium.

Description of the Related Art

A surveillance system in which states related to a plurality of devices, such as an air conditioner, a television set, and a refrigerator, can be monitored using a terminal apparatus, such as a smartphone and a tablet terminal, has heretofore been discussed (see WO 2020/017051).

In this surveillance system, a notification server obtains the states of the plurality of devices via a network. In response to obtaining the states of the devices, the notification server transmits notifications indicating information such as the operation states and power consumption of the devices to the terminal apparatus. The user can remotely find out the states of the devices from a notification screen presented on the terminal apparatus. In this surveillance system, notification conditions, such as time zones and days to issue a notification, can be set with respect to each of the devices. The user can switch on and off the notifications by setting the notification condition for each device.

In the conventional art, whether to notify information from a device is not changed depending on the user's state. For example, a user may want to receive facsimile (FAX) reception notifications and error notifications from devices installed in an office only when in the office. Such a user switches the notification settings of the devices installed in the office on when entering the office. The user switches the notification settings of the devices off when leaving the office. The user troublesomely makes such operations each time arriving at or leaving the office.

SUMMARY OF THE INVENTION

According to an aspect of the present invention, a system includes a reception unit configured to receive information from a device, a transmission unit configured to transmit the information received by the reception unit to an information terminal of a user, a detection unit configured to detect an attendance state which is changed by an entering-office operation made by the user and a leaving-office operation made by the user, and a control unit configured to determine whether to enable or disable transmission of the information to the information terminal of the user using the transmission unit based on the attendance state detected by the detection unit.

Further features of the present invention will become apparent from the following description of exemplary embodiments with reference to the attached drawings.

BRIEF DESCRIPTION OF THE DRAWINGS

FIG. 6 is a diagram illustrating device registration screens of the terminal apparatus according to the present exemplary embodiment.

FIG. 7 is a diagram illustrating device group registration screens of the terminal apparatus according to the present exemplary embodiment.

FIG. 22 is a diagram illustrating an attendance information table according to the present exemplary embodiment.

DESCRIPTION OF THE EMBODIMENTS

Exemplary embodiments of the present invention will be described in detail below with reference to the drawings. The following exemplary embodiments are not intended to limit the invention set forth in the claims, and all combinations of features described in the exemplary embodiments are not necessarily indispensable to the solving means of the invention.

Figure 1:
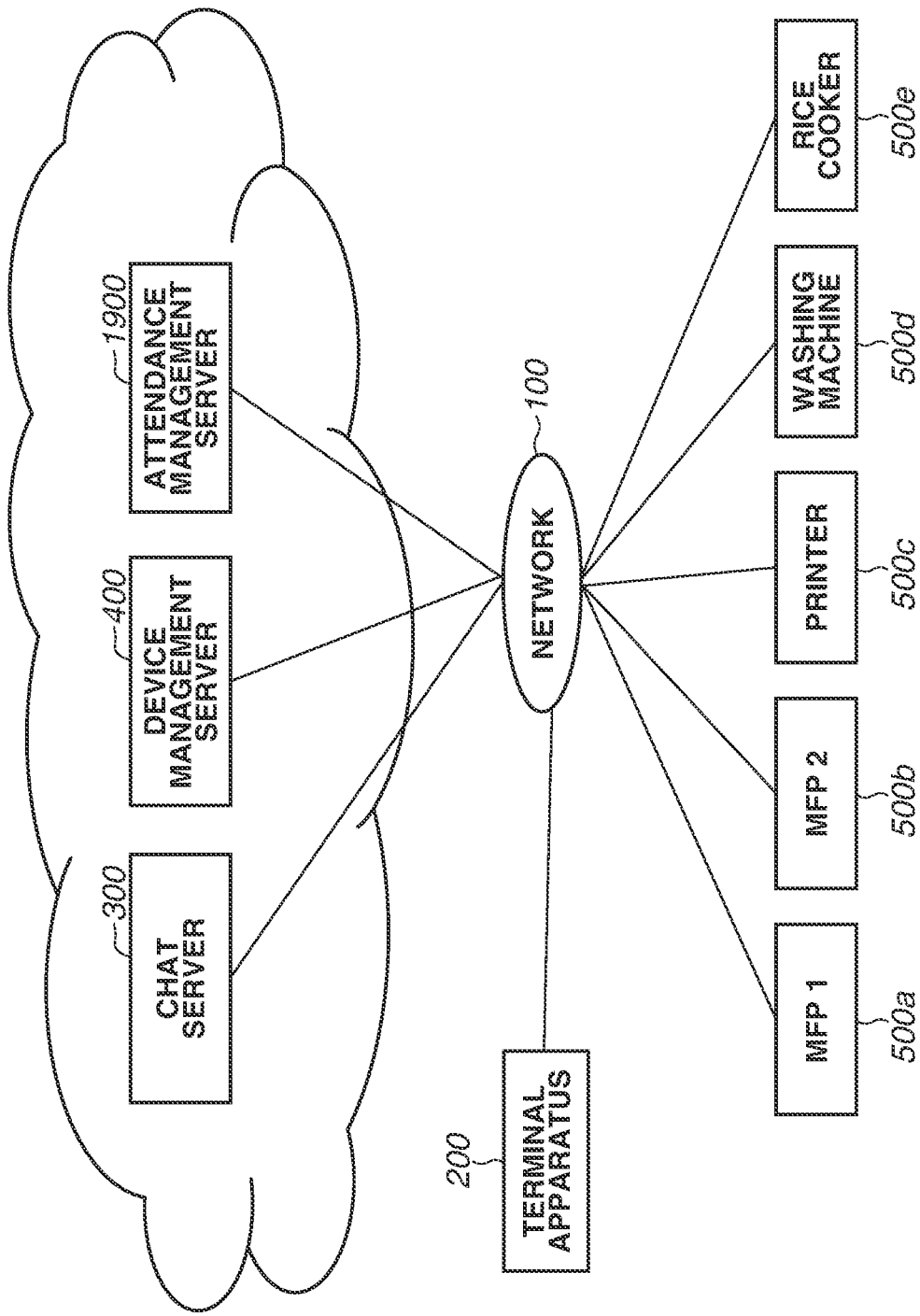
FIG. 1 is a system configuration diagram according to an exemplary embodiment.

A first exemplary embodiment of the present invention will be described below. FIG. 1 is a diagram illustrating an example of a notification system configuration according to the present exemplary embodiment. The notification system configuration according to the present exemplary embodiment includes a terminal apparatus 200 that is an example of an information processing apparatus and a plurality of connected devices 500a to 500e. The terminal apparatus 200 and the connected devices 500a to 500e are communicably connected to a device management server 400, a chat server 300, and an attendance management server 1900 via a network 100. The network 100 according to the present exemplary embodiment may be the Internet or a local area network (LAN). The network 100 may be wired or wireless. The terminal apparatus 200 is a mobile terminal that a user owns, such as a smartphone and a tablet. Alternatively, the terminal apparatus 200 is an electronic apparatus such as a personal computer and a tablet personal computer (PC). The user monitors the states of the plurality of connected devices 500a to 500e, issues control instructions, and performs work attendance management via the terminal apparatus 200. The attendance management server 1900 receives an attendance status transmitted from the terminal apparatus 200 and manages the user's attendance. The chat server 300 transmits various notifications related to the states of the connected devices 500a to 500e transmitted from the device management server 400 to the terminal apparatus 200. The device management server 400 monitors and controls operation of the plurality of connected devices 500a to 500e connected via the network 100. The device management server 400 also obtains the device states of the respective connected devices 500a to 500e, and transmits notification messages including the device states to the chat server 300 to notify the user of the notification messages. The chat server 300 and the device management server 400 may be configured as a single server.

Examples of the connected devices 500 include various electrical products installed in an office and at home, such as a multifunction peripheral (MFP), a lighting fixture, an air conditioner, a refrigerator, a microwave oven, and a television set. Such connected devices 500 are communicably connected to the device management server 400 via the network 100. Registration device information including information about the connected devices 500 is registered in the device management server 400, so that the connected devices 500 can accept control instructions and transmit state information from/to the device management server 400. In the present exemplary embodiment, an MFP 1 (500a), an MFP 2 (500b), a printer 500c, a washing machine 500d, and a rice cooker 500e are connected to the device management server 400 via the network 100. In the following description, the connected devices 500a to 500e will be referred to collectively as connected devices 500 when the connected devices 500a to 500e perform equivalent processing.

Figure 2:
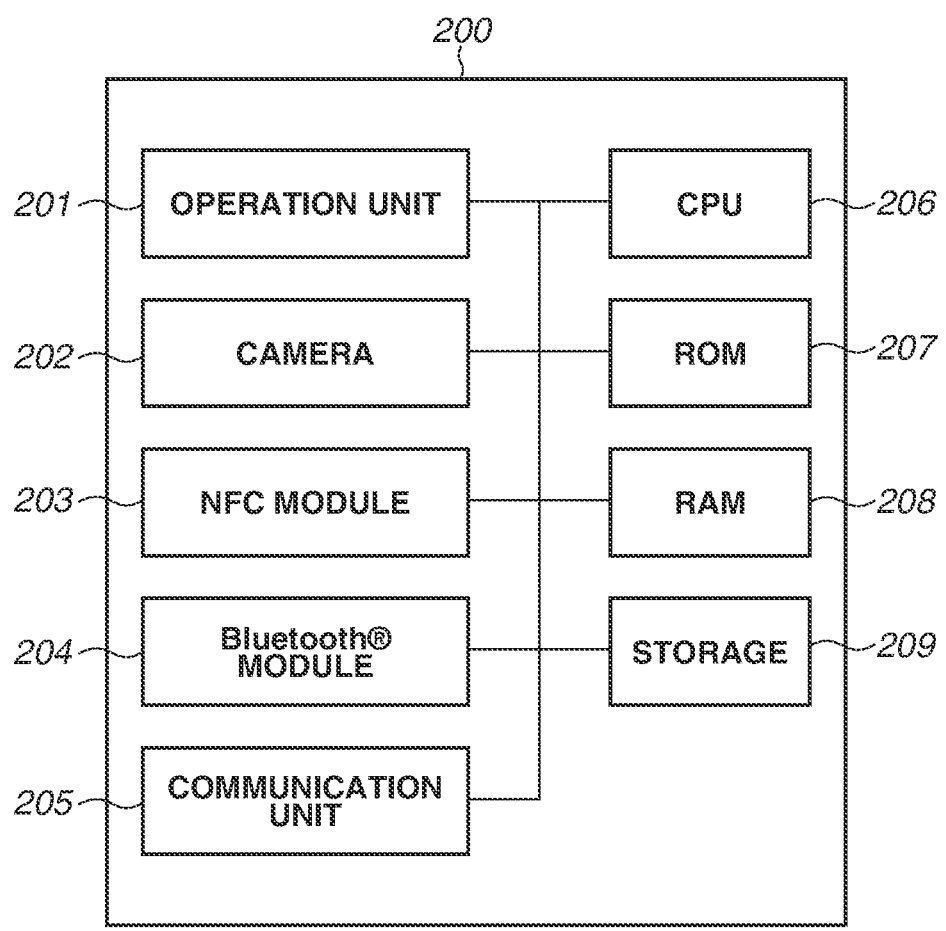
FIG. 2 is a hardware block diagram of a terminal apparatus according to the present exemplary embodiment.

FIG. 2 is a diagram illustrating an example of a hardware configuration of the terminal apparatus 200. An operation unit 201 includes a touchscreen function capable of detecting the user's touch operations. The operation unit 201 displays various screens provided by an operating system (OS) and a chat application. The user can input desired operation instructions to the terminal apparatus 200 by inputting touch operations to the operation unit 201.

Not-illustrated hardware keys may be used to input operation instructions to the terminal apparatus 200.

A camera 202 captures an image based on the user's imaging instruction. The terminal apparatus 200 can exchange data with various peripheral devices via a near field communication (NFC) module 203 and a Bluetooth® module 204. A communication unit 205 communicates with the chat server 300 connected via the network 100 to receive notifications and exchange messages. The communication unit 205 may perform wired communication using Ethernet, or wireless communication such as Wi-Fi communication. A central processing unit (CPU) 206 reads a control program stored in a read-only memory (ROM) 207 and performs various types of processing for controlling operation of the terminal apparatus 200. The ROM 207 stores the control program. A random access memory (RAM) 208 is used as a temporary storage area, such as a main memory, and a work area of the CPU 206. A storage 209 stores various types of data, including image data captured by the camera 202 and image data and electronic documents downloaded via the communication unit 205.

Figure 3:
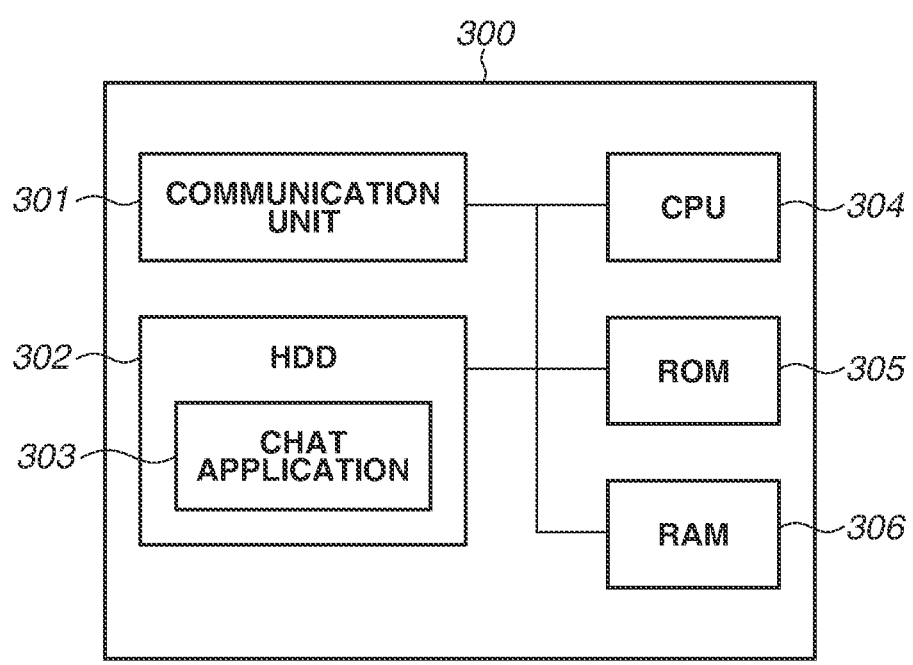
FIG. 3 is a hardware block diagram of a chat server according to the present exemplary embodiment.

FIG. 3 is a diagram illustrating an example of a hardware configuration of the chat server 300. A communication unit 301 can transmit and receive data to/from the terminal apparatus 200 and the device management server 400 via the network 100. A hard disk drive (HDD) 302 stores various types of data, such as user information, notification messages, and image data. The HDD 302 also stores a chat application 303 for performing a chat service, so that messages can be exchanged between users and notification can be issued to a specific user. The message transmission and notification can be performed by specifying an identifier (ID) uniquely indicating a user or an ID uniquely indicating the terminal apparatus 200 as a destination. The user can use the chat service by registering user information including their user ID and the ID of the terminal apparatus 200 in the chat server 300 in advance. The chat server 300 may be configured to share the registered user information with the device management server 400 and the attendance management server 1900. A CPU 304 reads a control program stored in a ROM 305 and performs various types of processing for controlling operation of the chat server 300. The ROM 305 stores the control program. A RAM 306 is used as a temporary storage area, such as a main memory, and a work area of the CPU 304.

Figure 4:
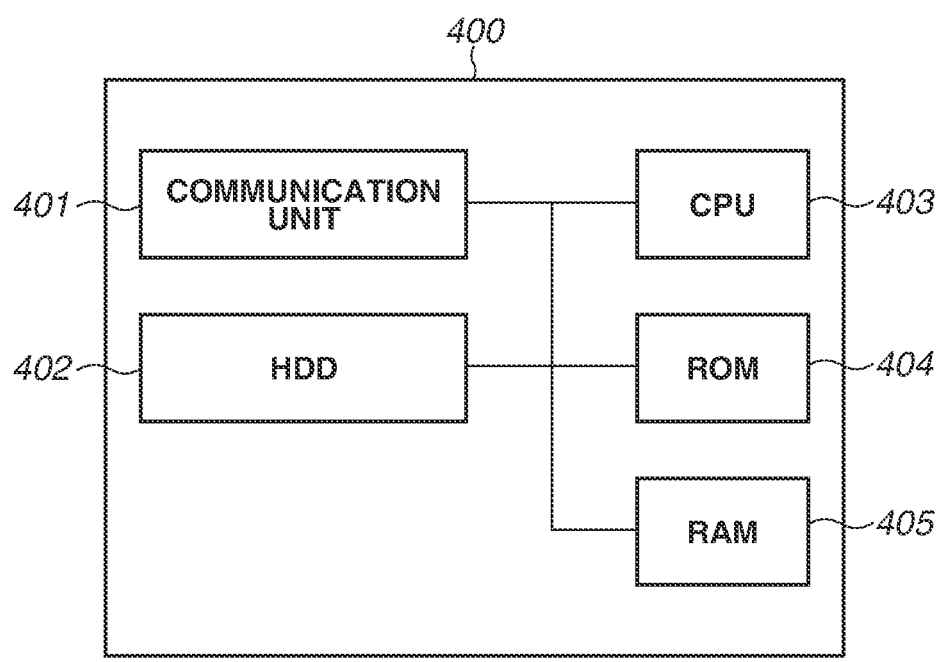
FIG. 4 is a hardware block diagram of a device management server according to the present exemplary embodiment.

FIG. 4 is a diagram illustrating an example of a hardware configuration of the device management server 400. A communication unit 401 can transmit and receive data to/from the connected devices 500 and the chat server 300 via the network 100. Moreover, the communication unit 401 obtains state information indicating the states of the connected devices 500 connected. As the state information, the communication unit 401 obtains operating statuses of the connected devices 500, setting information, error information, and types of events occurred. To register the connected devices 500 and obtain the state information about the connected devices 500, the user information including the user ID and the ID of the terminal apparatus 200 is to be registered in the device management server 400 in advance. The communication unit 401 may be configured to share the registered user information with the chat server 300. An HDD 402 stores various types of data, including the user information, the registration device information about the connected devices 500 that have been registered by the user, group information about a group or groups to which the connected devices 500 belong, notification settings of the connected devices 500, and the state information obtained from the connected devices 500. A CPU 403 reads a control program stored in a ROM 404 and performs various types of processing for controlling operation of the device management server 400. The ROM 404 stores the control program. A RAM 405 is used as a temporary storage area, such as a main memory and a work area of the CPU 403.

Figure 19:
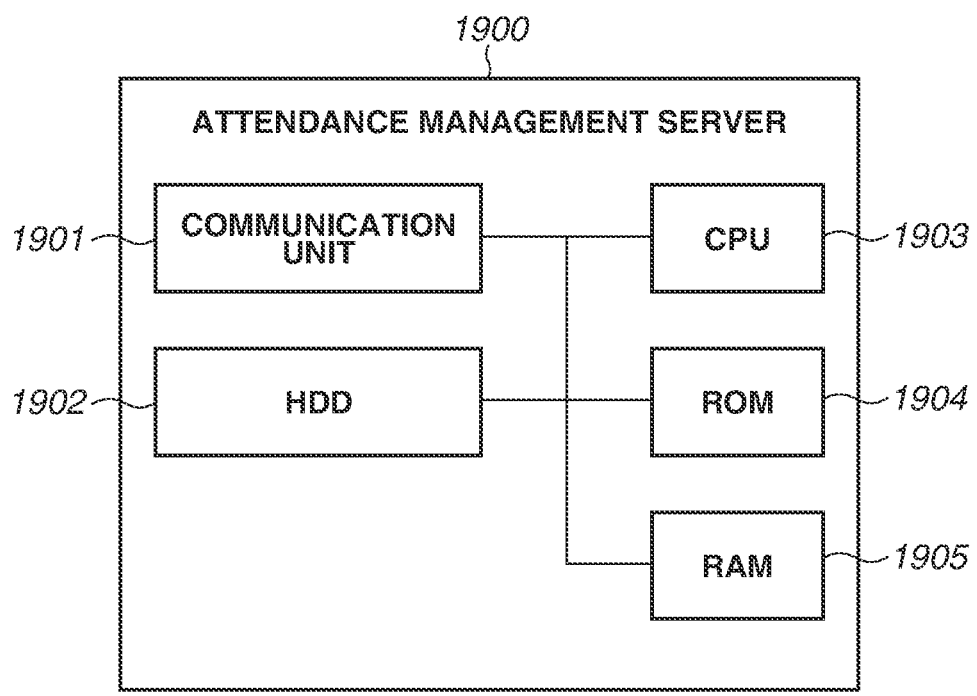
FIG. 19 is a hardware configuration diagram of an attendance management server according to the present exemplary embodiment.

FIG. 19 is a diagram illustrating an example of a hardware configuration of the attendance management server 1900. A communication unit 1901 can transmit and receive data to/from the terminal apparatus 200 via the network 100, and accepts a change in attendance information from the terminal apparatus 200 connected. An HDD 1902 stores the attendance information and other various types of data. A CPU 1903 reads a control program stored in a ROM 1904 and performs various types of processing for controlling operation of the attendance management server 1900. The ROM 1904 stores the control program. A RAM 1905 is used as a temporary storage area, such as a main memory and a work area of the CPU 1903.

Figure 20:
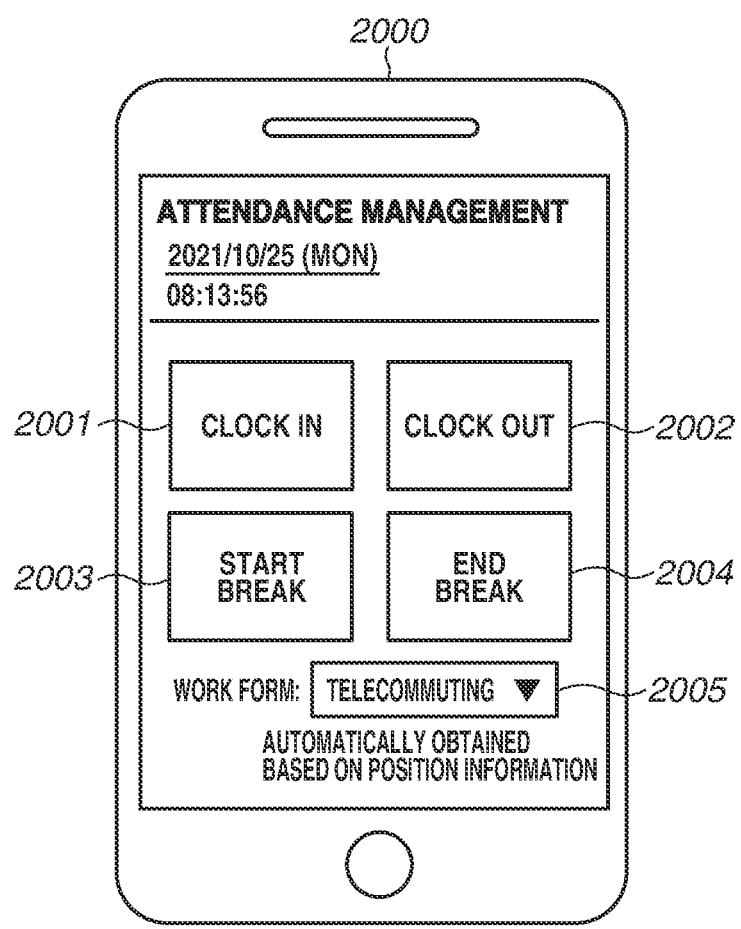
FIG. 20 is a diagram illustrating a terminal apparatus user interface (UI) screen for attendance management according to the present exemplary embodiment.

FIG. 20 illustrates a user interface (UI) screen 2000 for attendance management on a smartphone, for example. The UI screen 2000 for attendance management receives a change in the attendance information using a clock-in button 2001, a clock-out button 2002, a start break button 2003, and an end break button 2004. In a work form field 2005, a work form, such as telecommuting and working from home, can be selected. The attendance management server 1900 stores the attendance information received from the terminal apparatus 200 into the HDD 1902. While the present exemplary embodiment is described by using a smartphone as an example, a PC, a tablet PC, or a system that records attendance based on integrated circuit (IC) card touch may be used.

Figure 21:
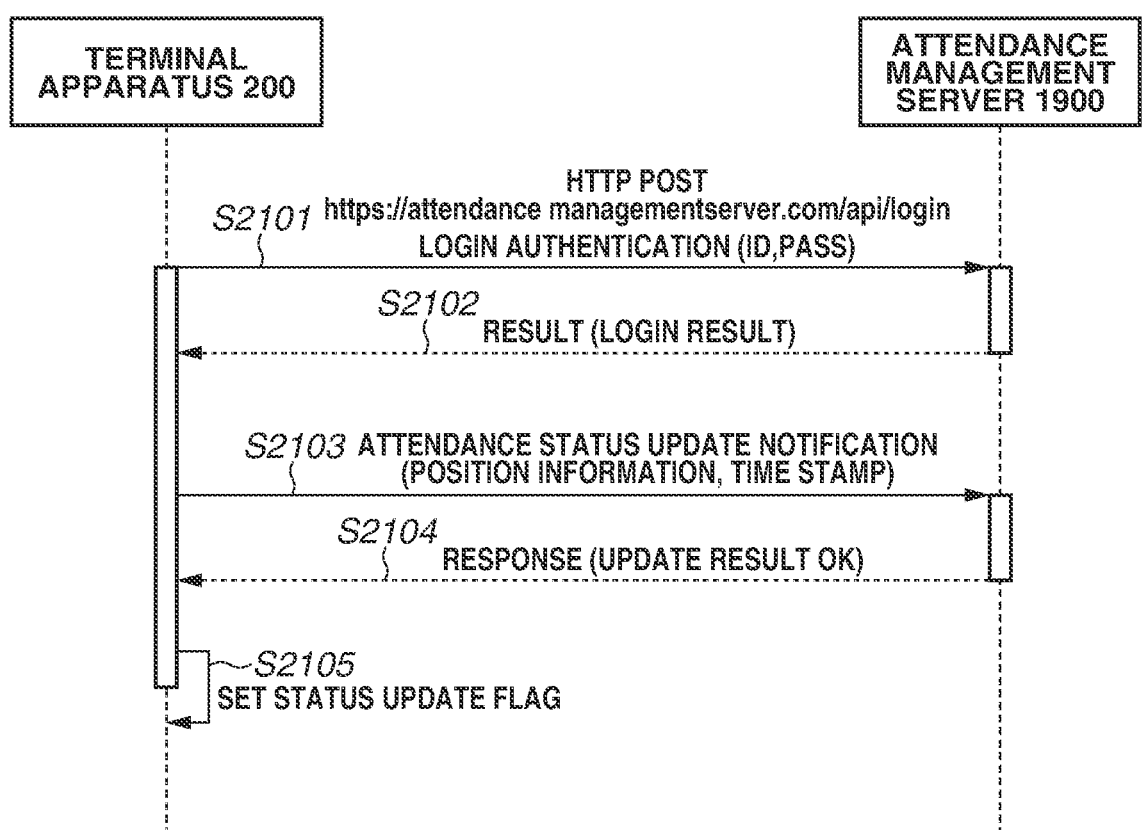
FIG. 21 is a diagram illustrating an attendance status update sequence according to the present exemplary embodiment.

FIG. 21 illustrates an example of an attendance status update sequence between the terminal apparatus 200 and the attendance management server 1900. The processing of the terminal apparatus 200 is performed by the CPU 206. The processing of the attendance management server 1900 is performed by the CPU 1903. In step S2101, the terminal apparatus 200 initially logs in to the attendance management server 1900. In step S2102, the attendance management server 1900 returns a login result to the terminal apparatus 200. If the login is successful, the operation unit 201 of the terminal apparatus 200 displays the UI screen 2000 for attendance management illustrated in FIG. 20. If the user selects any one of the buttons 2001, 2002, 2003, and 2004 on the UI screen 2000 for attendance management, then in step S2103, the terminal apparatus 200 issues an attendance status update notification to the attendance management server 1900. In step S2104, the attendance management server 1900 returns an update result to the terminal apparatus 200. If the update result is OK, then in step S2105, the CPU 206 sets a "status update flag" stored in the ROM 207 or the storage 209.

FIG. 22 illustrates an example of the attendance information stored in the HDD 1902. The HDD 1902 stores attendance information including a date and time of entry 2200, a work form 2201, a workplace (position information) 2202, and a date and time of leaving 2203. To transmit and receive the attendance information, the user information including the user ID and the ID of the terminal apparatus 200 is to be registered in the attendance management server 1900. The attendance management server 1900 may be configured to share the registered user information with the chat server 300 and the device management server 400.

Figure 5:
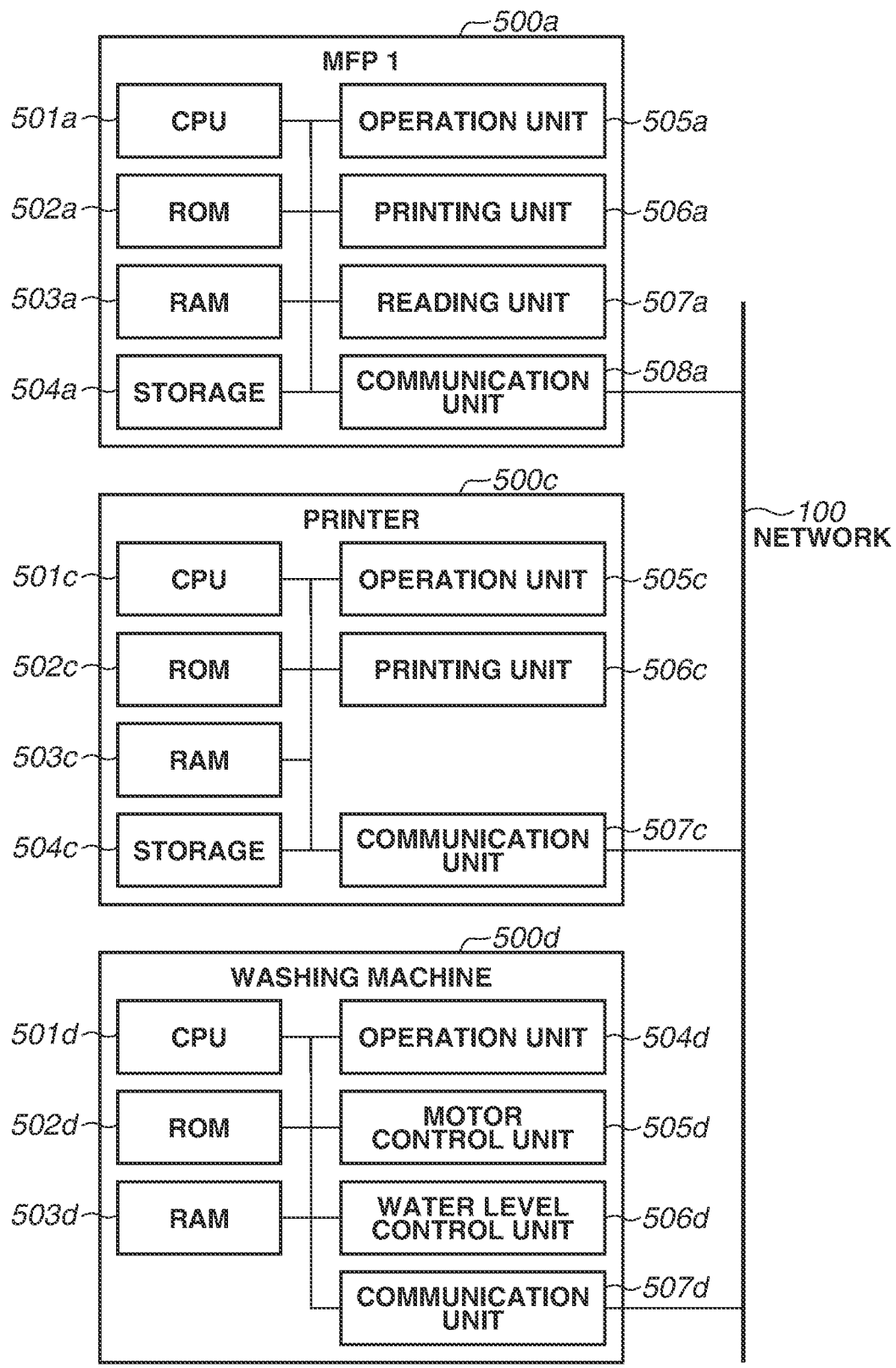
FIG. 5 is a hardware block diagram of a plurality of devices according to the present exemplary embodiment.

FIG. 5 is a diagram illustrating an example of a hardware configuration of the MFP 1 (500a), the printer 500c, and the washing machine 500d that are connected devices.

The MFP 1 (500a) includes a CPU 501a, a ROM 502a, a RAM 503a, a storage 504a, an operation unit 505a, a printing unit 506a, a reading unit 507a, and a communication unit 508a. The CPU 501a controls operation of the entire MFP 1 (500a). The CPU 501a reads a control program stored in the ROM 502a or the storage 504a into the RAM 503a and performs various types of control, such as read control and print control. The RAM 503a is used as a work area of the CPU 501a and a temporary storage area for loading various control programs stored in the ROM 502a and the storage 504a. The storage 504a stores image data, print data, various programs, and various types of setting information. In the present exemplary embodiment, the storage 504a is assumed to be a flash memory. In another embodiment, auxiliary storage devices, such as a solid-state drive (SSD) and an HDD, may be used. An embedded MultiMediaCard (eMMC) may be used. The MFP 1 (500a) according to the present exemplary embodiment executes each of processes illustrated in a flowchart to be described below by the one CPU 501a using one memory (RAM 503a). However, this is not restrictive. For example, each of the processes illustrated in the flowchart to be described below may be executed through cooperation of a plurality of CPUs, RAMs, ROMs, and storages. Hardware circuits, such as an application-specific integrated circuit (ASIC) and a field programmable gate array (FPGA), may be used to execute some of the processes. Examples of the operation unit 505a include a display unit, such as a touchscreen, and hardware keys. The operation unit 505a displays information to the user and detects input from the user. The printing unit 506a can print image data (print data) stored in the RAM 503a on a recording sheet fed from a feed cassette. The reading unit 507a reads a document image, and the CPU 501a converts the image into image data, such as binary data. The image data generated based on the image read by the reading unit 507a is transmitted to an external apparatus or printed on a recording sheet. The communication unit 508a connects to the network 100. The communication unit 508a transmits state information about the inside state of the device to the device management server 400. Examples of the state information include the statuses of copy and facsimile (FAX) jobs, notifications of the remaining levels and low-level of toner and printing sheets (recording materials), error information about a failure location, and the type of event occurred. The communication unit 508a also transmits image data to an external apparatus on the network 100 and receives print data from the terminal apparatus 200. As a method for transmission and reception via the network 100, email-based transmission and reception and file transmission using other protocols (such as the File Transfer Protocol (FTP), Server Message Block (SMB), and Web Distributed Authoring and Versioning (WebDAV)) can be performed. The communication unit 508a can further transmit and receive image data and various types of setting data via the network 100 through access from the terminal apparatus 200 using Hypertext Transfer Protocol (HTTP) communication.

The printer 500c includes a CPU 501c, a ROM 502c, a RAM 503c, a storage 504c, an operation unit 505c, a printing unit 506c, and a communication unit 507c. The CPU 501c controls operation of the entire printer 500c. The CPU 501c reads a control program stored in the ROM 502c or the storage 504c into the RAM 503c and performs various types of control, such as print control. The ROM 502c stores control programs executable by the CPU 501c. The RAM 503c is a main storage memory, and used as a work area and a temporary storage area for loading various control programs stored in the ROM 502c and the storage 504c. The storage 504c stores image data, print data, various programs, and various types of setting information. In the present exemplary embodiment, the storage 504c is assumed to be a flash memory. In another embodiment, auxiliary storage devices, such as an SSD and an HDD, may be used. Alternatively, an eMMC may be used. The printer 500c according to the present exemplary embodiment executes each of processes illustrated in a flowchart to be described below by the one CPU 501c using one memory (RAM 503c). However, this is not restrictive. For example, each of the processes illustrated in the flowchart to be described below may be executed through cooperation of a plurality of CPUs, ROMs, RAMs, and storages. Hardware circuits such as an ASIC and an FPGA may be used to execute some of the processes. Examples of the operation unit 505c include a display unit, such as a touchscreen, and hardware keys. The operation unit 505c displays information to the user and detects input from the user. The printing unit 506c prints image data (print data) stored in the RAM 503c on a recording sheet fed from a feed cassette. The communication unit 507c connects to the network 100. The communication unit 507c transmits state information about the inside state of the device to the device management server 400. Examples of the state information include the status of a print job, notifications of the remaining levels and low-level of toner and printing sheets (recording materials), error information about a failure, and the type of event occurred. The communication unit 507c also receives print data from the terminal apparatus 200 on the network 100.

The washing machine 500d includes a CPU 501d, a ROM 502d, a RAM 503d, an operation unit 504d, a motor control unit 505d, a water level control unit 506d, and a communication unit 507d. The CPU 501d controls operation of the entire washing machine 500d. The CPU 501d reads a control program stored in the ROM 502d into the RAM 503d and performs various types of control, such as motor control and water level control. The ROM 502d stores control programs executable by the CPU 501d. The RAM 503d is a main storage memory, and used as a work area and a temporary storage area for loading various control programs stored in the ROM 502d. Examples of the operation unit 504d include a display unit, such as a touchscreen, and hardware keys. The motor control unit 505d controls the number of motor revolutions of a washing tub. The water level control unit 506d controls the water level in the washing tub, and controls water supply and drainage. The communication unit 507d connects to the network 100. The communication unit 507d transmits state information about the inside state of the device to the device management server 400. Examples of the state information include an operating status, error information about a failure, and the type of event occurred. The communication unit 507d also receives control instructions from an external apparatus on the network 100.

FIG. 6 illustrates examples of screens for registering a connected device 500 in the device management server 400 displayed on the operation unit 201 of the terminal apparatus 200.

A screen 600a is a screen displaying connected devices 500 having been registered in the device management server 400. Names freely given to the connected devices 500 by the user and the categories of the connected devices 500 are listed in a column 601 and a column 602, respectively. Examples of the categories of the connected devices 500 include an MFP, a printer, a rice cooker, and a washing machine. The user registers user information in the device management server 400 in advance before device registration. To register a new device in the device management server 400, the user selects a device addition button 603 displayed on the screen 600a.

A screen 600b is a screen displayed with the selection of the device addition button 603 by the user as a trigger, and lists devices not registered in the device management server 400. For example, the screen 600b displays the categories and product names of the devices. The devices to be listed may be ones recognized via the NFC module 203 or the Bluetooth® module 204 of the terminal apparatus 200, or ones belonging to the same network 100. The user selects a device 604 to be registered in the device management server 400 from the devices displayed on the screen 600b.

A screen 600c is a screen displayed with the selection of any one of the devices listed on the screen 600b by the user as a trigger. The category and product name of the device selected on the screen 600b, "PRINTER (PRINTER-2000B)", are displayed in a field 605.

A name field 606 for inputting a name for the selected device is also displayed, and the user freely inputs a name into the name field 606. After the input of the name, the user selects a registration button 607, so that registration device information is transmitted to the device management server 400 and the registration is completed. Aside from the name input from the screen 600c, the registration device information includes the category, product name, and media access control (MAC) address of the device, for example. The registration device information also includes information, such as identification information uniquely assigned to the device, such as a serial number, and the user information about the registering user.

FIG. 7 illustrates examples of screens for performing group registration of connected devices 500 displayed on the operation unit 201 of the terminal apparatus 200. The group registration refers to registration by which the user registers one or more of two or more connected devices 500 in the device management server 400 collectively as a group.

A screen 700a is a screen displaying group information about the connected devices 500, and displays the connected devices 500 registered in the device management server 400. In the present exemplary embodiment, the names freely given to the connected devices 500 by the user and groups to which the connected devices 500 belong are listed in a column 701 and a column 702, respectively. To register a new group in the device management server 400, the user selects a new group registration button 703 displayed on the screen 700a.

A screen 700b is a screen displayed with the selection of the new group registration button 703 by the user as a trigger. The screen 700b displays a group name field 704 for inputting the name of the new group to be generated, and the user can freely input a group name. A connected device field 705 displays the connected devices 500 and checkboxes 706 to select whether to make the connected devices 500 belong to the new group. The user checks on a connected device or devices 500 to make belong to the new group and then selects a registration button 707, so that group information is transmitted to the device management server 400 and the group registration is completed. For example, the group information includes information, such as the group name input from the screen 700b, the registration device information about the connected device(s) 500 checked, and the user information about the group-creating user. In the example of the screen 700b, three connected devices "STUDY PRINTER", "HOME KITCHEN RICE COOKER", and "HOME WASHING MACHINE" are illustrated to be made to belong to a group with a group name "HOME APPLIANCES". The present exemplary embodiment is configured so that the connected devices 500 belong to a single group each. However, each connected device 500 may belong to a plurality of hierarchized groups. For example, the "HEADQUARTERS 1F MFP" may belong to two groups, namely, a "HEADQUARTERS PRINTER" group and a "HEADQUARTERS 1F PRINTER" group that is a subgroup of the "HEADQUARTERS PRINTER" group.

Figure 8:
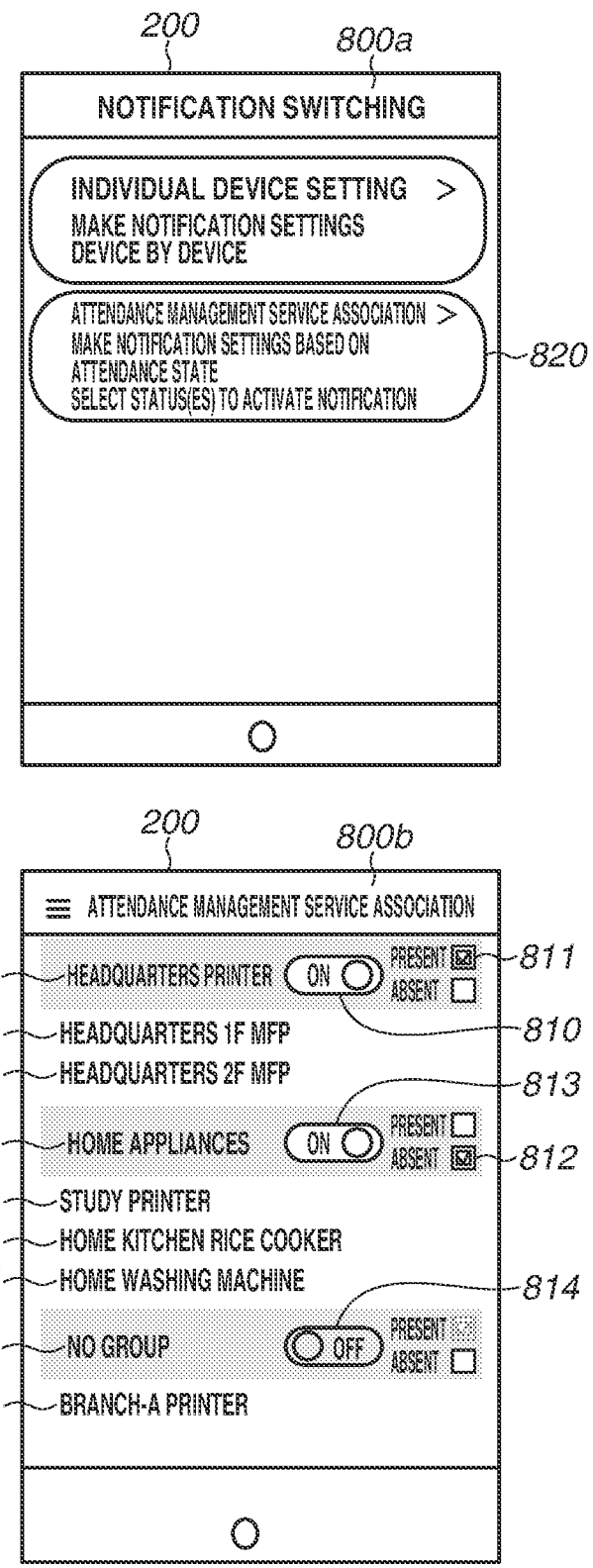
FIG. 8 is a diagram illustrating notification switch setting screens of the terminal apparatus according to the present exemplary embodiment.

FIG. 8 illustrates examples of notification setting screens displayed on the operation unit 201 of the terminal apparatus 200. Using a notification setting screen 800a, the user can switch notification settings as to whether to display various notifications related to the states of the connected devices 500 generated by the device management server 400 on the terminal apparatus 200. If attendance management service association 820 is selected, a notification setting screen 800b appears.

Notification settings made on the notification setting screen 800b are transmitted to and stored in the device management server 400.

The notification setting screen 800b displays the groups registered in the device management server 400 and the connected devices 500 belonging to the groups. Toggle switches for attendance management service association settings to switch whether to issue notifications associated with an attendance management service to the connected devices 500 belonging to the respective groups are also displayed. By turning a toggle switch for an attendance management service association setting off, the user can collectively perform switching so that the notifications associated with the attendance management service are not issued to any of the connected devices 500 belonging to that group. Similarly, by turning a toggle switch for an attendance management service association setting on, the user can collectively perform switching so that the notifications associated with the attendance management service are issued to all the connected devices 500 belonging to that group. For example, the notification setting screen 800b displays a "HEADQUARTERS PRINTER" group 801 that is a group registered in the device management server 400, and a "HEADQUARTERS 1F MFP" 802 and a "HEADQUARTERS 2F MFP" 803 that are connected devices 500 belonging to the group. By turning an attendance management service association setting 810 of the "HEADQUARTERS PRINTER" group 801 on, the user can collectively switch the settings of the connected devices 802 and 803 belonging to the "HEADQUARTERS PRINTER" group 801 on. Moreover, with the attendance management service association setting 810 on, the user can select in which case to issue a notification, the user's attendance state is "present" or "absent". If a selection box "present" 811 is checked, notifications are issued when the user's attendance state is present. Similarly, the notification setting screen 800b displays a "HOME APPLIANCES" group 804, and a "STUDY PRINTER" 805, a "HOME KITCHEN RICE COOKER" 806, and a "HOME WASHING MACHINE" 807 that are all the connected devices belonging to the "HOME APPLIANCES" group 804. By turning an attendance management service association setting 813 of the "HOME APPLIANCES" group 804 on, the user can collectively switch the settings of the connected devices 805, 806, and 807 belonging to the "HOME APPLIANCES" group 804 on. If a selection box "absent" 812 is checked, the notifications from the connected devices 805, 806, and 807 belonging to the "HOME APPLIANCES" group 804 are issued when the attendance state of the user is absent. Connected devices not belonging to any group may be collectively displayed as a "NO GROUP" group 808. An attendance management service association setting 814 of the "NO GROUP" group 808 is off, and the setting of a "BRANCH-A PRINTER" 809 not belonging to any of the groups is accordingly off. The settings of the connected devices may be individually changed so that the connected devices are switched to a setting different from the attendance management service association settings for the groups to which the connected devices belong. For example, with the attendance management service association setting 813 of the "HOME APPLIANCES" group 804 on, the setting of only the "STUDY PRINTER" 805 may be switched off. The notification setting screen 800b may include a "device individual setting" setting unit for making individual changes. If a connected device 500 belongs to a plurality of hierarchized groups, the attendance management service association setting at a lower level and the notification settings of all the connected devices belonging to the lower group may be collectively switched by switching the attendance management service association setting of the upper group. The lower group may be switchable to an attendance management service association setting different from that of the upper group. Suppose, for example, that the attendance management service association setting of the "HEADQUARTERS PRINTER" group that is an upper group is switched on. The attendance management service association setting of the "HEADQUARTERS 1F PRINTER" group that is a lower group then may be set to off while that of the "HEADQUARTERS 2F PRINTER" group is set to on. In such a case, the attendance management service association settings of the connected devices 500 belonging to the "HEADQUARTERS 1F PRINTER" group are collectively switched off, and the attendance management service association settings of the connected devices 500 belonging to the "HEADQUARTERS 2F PRINTER" group are collectively switched on. While in the present exemplary embodiment the notification conditions can be selected between "present" and "absent", there may be options such as "on-duty" and "off-duty". This can prevent notifications during a break.

Figure 18:
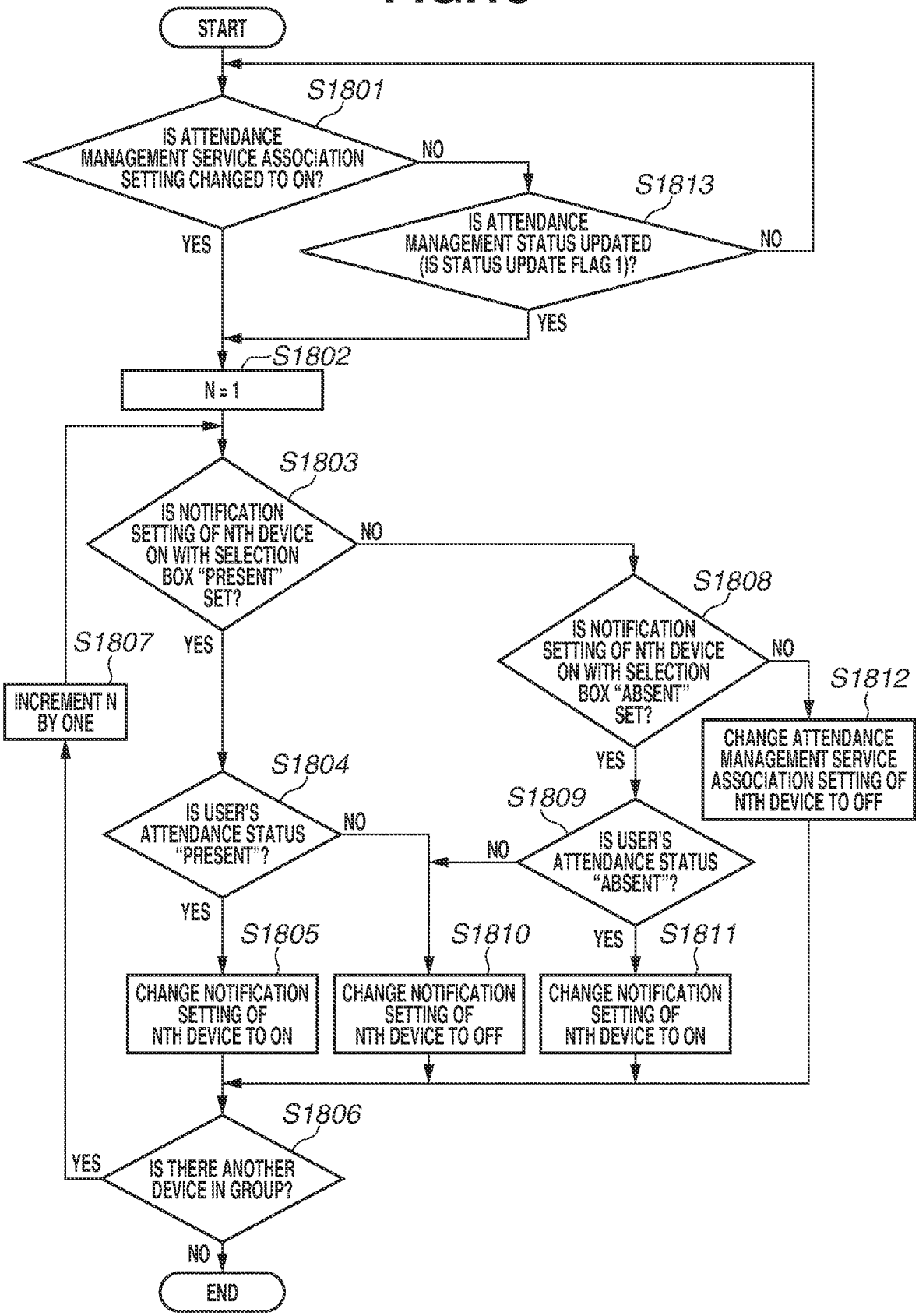
FIG. 18 is a notification switch setting processing flowchart of the terminal apparatus according to the present exemplary embodiment.

FIG. 18 is a notification switch setting processing flowchart of the terminal apparatus 200. The CPU 206 of the terminal apparatus 200 performs notification switch processing by executing the processing of this flowchart at regular intervals. Each of the operations (steps) of the flowchart is performed by the CPU 206 reading a control program stored in the ROM 207 or the storage 209 into the RAM 208. A case where the attendance management service association setting 810 is selected will be described as an example, whereas the processing illustrated in the flowchart of FIG. 18 is also performed when the attendance management service association setting 813 or the attendance management service association setting 814 is selected. Aside from being executed at regular intervals, the processing of this flowchart may be executed with the switching of the attendance management service association setting 810 as a trigger.

In step S1801, the CPU 206 determines whether the attendance management service association setting 810 is changed. If the attendance management service association setting 810 is originally off and the attendance management service association setting 810 is selected by the user, the CPU 206 determines that the attendance management service association setting 810 is changed to on. If the attendance management service association setting 810 is determined to be changed to on (YES in step S1801), the processing proceeds to step S1802. If the attendance management service association setting 810 is determined to not be changed to on (NO in step S1801), the processing proceeds to step S1813. In step S1813, the CPU 206 checks whether an attendance management status is updated (status update flag is 1). If the attendance management status is updated (YES in step S1813), the processing proceeds to step S1802. In step S1802, the CPU 206 stores a variable N into the RAM 208, and sets the variable N to 1.

In step S1803, the CPU 206 determines whether the notification setting of the Nth device in the group of the attendance management service association setting 810 is on and the selection box "present" 811 is checked. If the determination is yes (YES in step S1803), the processing proceeds to step S1804. In step S1804, the CPU 206 determines whether the user's attendance status is "present". If the attendance status is "present" (YES in step S1804), the processing proceeds to step S1805. In step S1805, the CPU 206 changes the notification setting of the Nth device to on. If the original notification setting of the Nth device is on, the CPU 206 maintains the setting. In step S1804, if the user's attendance status is "absent" (NO in step S1804), the processing proceeds to step S1810. In step S1810, the CPU 206 changes the notification setting of the Nth device to off. If the original notification setting of the Nth device is off, the CPU 206 maintains the setting.

In step S1806, the CPU 206 determines whether there is another device in the group.

If the CPU 206 determines that there is another device in the group (YES in step S1806), the processing proceeds to step S1807. In step S1807, the CPU 206 increments the variable N by one. In step S1806, if the CPU 206 determines that there is no other device in the group (NO in step S1806), the processing illustrated in the flowchart of FIG. 18 is ended.

In step S1808, the CPU 206 determines whether the attendance management service association setting 810 is on and the selection box "absent" is checked. If the determination is yes (YES in step S1808), the processing proceeds to step S1809. In step S1809, the CPU 206 determines whether the user's attendance status is "absent". If the user's attendance status is "absent" (YES in step S1809), the processing proceeds to step S1811. In step S1811, the CPU 206 changes the notification status of the Nth device to on. If the original notification setting of the Nth device is on, the CPU 206 maintains the setting. In step S1809, if the user's attendance status is "present" (NO in step S1809), the processing proceeds to step S1810. In step S1810, the CPU 206 changes the notification setting of the Nth device to off. If the original notification setting of the Nth device is off, the CPU 206 maintains the setting.

In step S1812, the CPU 206 changes the attendance management service association setting 810 to off. The processing proceeds to step S1806.

The notification settings on and off of the respective connected devices 500 set through the processing of this flowchart are transmitted to and stored in the device management server 400.

Figure 9:
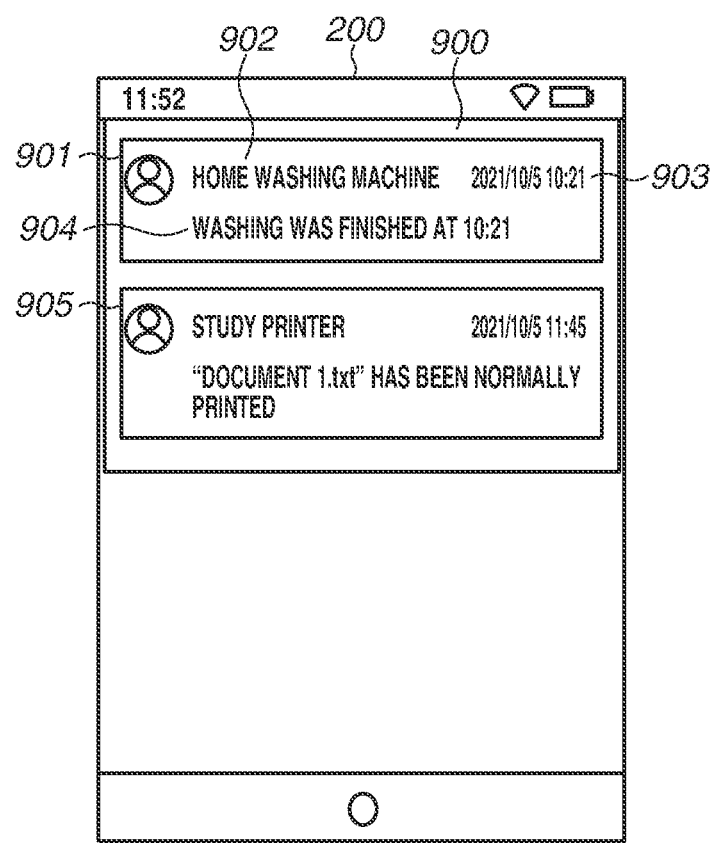
FIG. 9 is a diagram illustrating a notification screen of the terminal apparatus according to the present exemplary embodiment.

FIG. 9 illustrates an example of a notification screen displayed on the operation unit 201 of the terminal apparatus 200. A notification screen 900 displays notifications related to the states of connected devices 500 transmitted from the chat server 300. In the case of the notification screen 900, two notifications 901 and 905 are displayed. For example, as illustrated by the notification 901, the notification includes an icon and a name 902 of the connected device, a date and time of notification 903, and a message 904 about the state of the connected device 500. The notification 901 indicates that the terminal apparatus 200 received a notification about the state of the connected device named "HOME WASHING MACHINE" at "2021/10/5 10:21". The message 904 notifies the user that the "HOME WASHING MACHINE" finished washing at 10:21. Similarly, the notification 905 indicates that the terminal apparatus 200 received a notification about the state of the connected device named "STUDY PRINTER" at "2021/10/5 11:45". The message notifies the user that the "STUDY PRINTER" has normally finished printing. The notification screen 900 may be displayed on a chat application that is installed on the terminal apparatus 200 in advance and communicates with the chat server 300 to provide a chat service. Alternatively, the notification screen 900 may be displayed on a status area constantly displayed on the operation unit 201 or on a lock screen.

Figure 10:
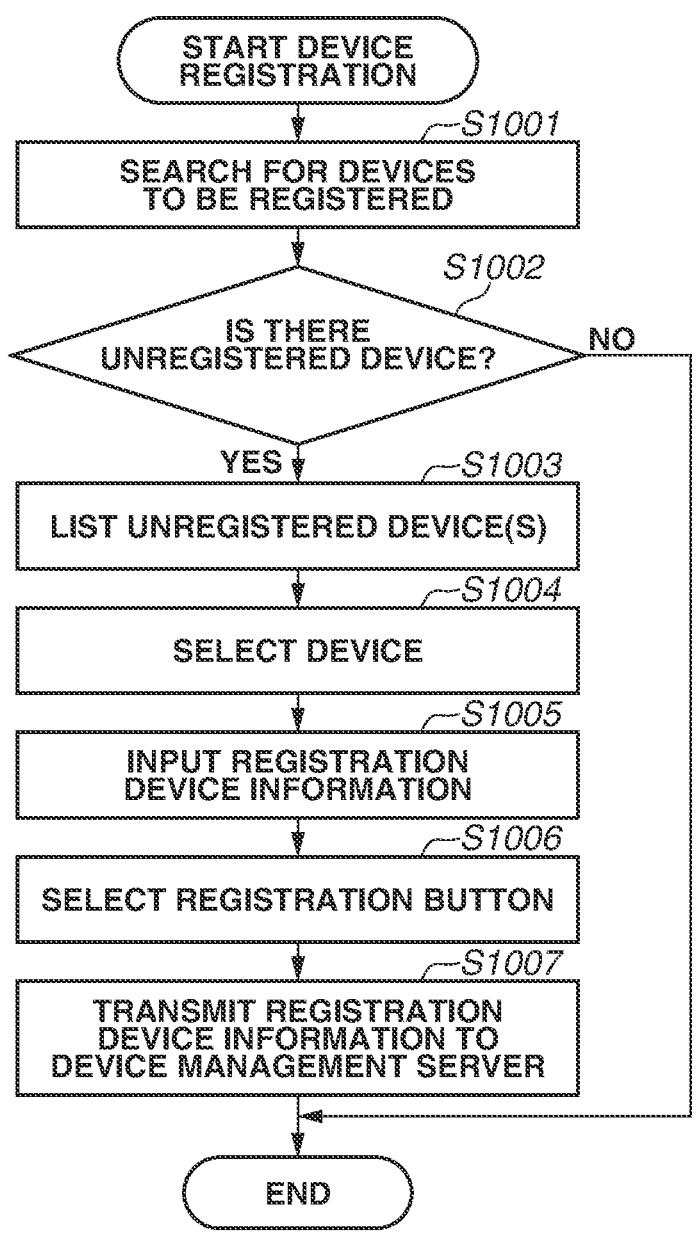
FIG. 10 is a device registration processing flowchart of the terminal apparatus according to the present exemplary embodiment.

FIG. 10 is a flowchart related to device registration which is started with the selection of the device addition button 603 on the screen 600*a* displayed on the operation unit 201 of the terminal apparatus 200 as a trigger. Each of the operations (steps) of the flowchart is performed by the CPU 206 reading a control program stored in the ROM 207 or the storage 209 into the RAM 208.

In step S1001, the CPU 206 searches for devices to be registered in the device management server 400, and obtains identification information for uniquely identifying the devices. The devices may be searched for by obtaining information about devices belonging to the same network (LAN) via the communication unit 205 using the Address Resolution Protocol (ARP). The devices may be detected using a short-distance wireless communication unit, such as the NFC module 203 and the Bluetooth® module 204. The MAC addresses or serial numbers of the devices are obtained as the identification information.

In step S1002, the CPU 206 inquires of the device management server 400 and determines whether the identification information about the devices found by the search in step S1001 is already registered in the device management server 400. If the result of the inquiry indicates that there is one or more devices unregistered in the device management server 400 among the devices found by the search in step S1001 (YES in step S1002), the processing proceeds to step S1003. If there is no device unregistered in the device management server 400 (NO in step S1002), the device registration processing is ended.

In step S1003, the CPU 206 lists the device(s) determined to be unregistered in the device management server 400 in step S1002 on the screen 600*b*.

In step S1004, the terminal apparatus 200 receives selection of one of the devices displayed on the screen 600*b* through the operation of the operation unit 201.

In step S1005, the user inputs registration device information, such as the name of the device selected in step S1004, into the screen 600*c*.

In step S1006, the terminal apparatus 200 receives selection of the registration button 607 displayed on the screen 600*c* via the operation unit 201.

In step S1007, the CPU 206 transmits the registration device information to the device management server 400 via the communication unit 205.

Figure 11:
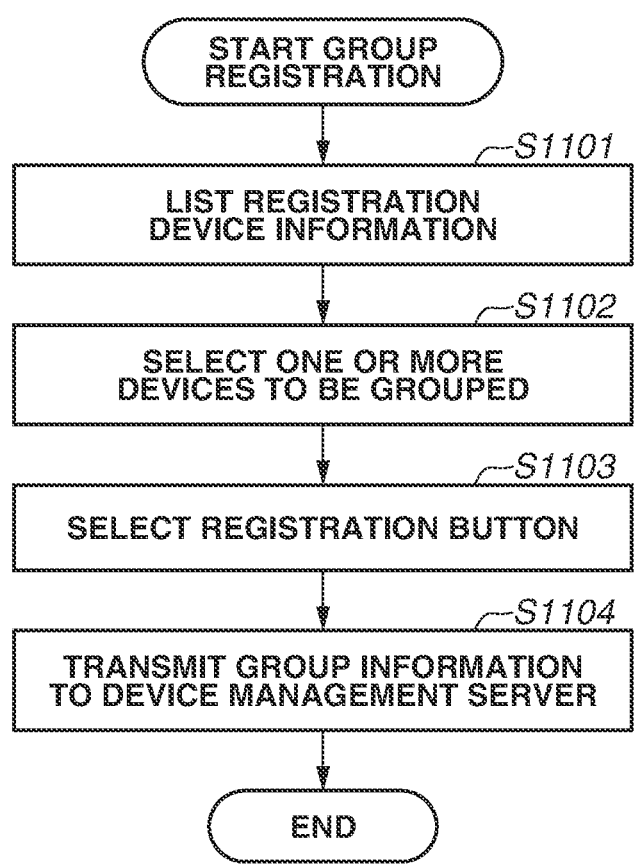
FIG. 11 is a device group registration flowchart of the terminal apparatus according to the present exemplary embodiment.

FIG. 11 is a flowchart related to the group registration which is started with the selection of the new group registration button 703 on the screen 700*a* displayed on the operation unit 201 of the terminal apparatus 200 as a trigger. Each of the operations (steps) of the flowchart is performed by the CPU 206 reading a control program stored in the ROM 207 or the storage 209 into the RAM 208.

In step S1101, the CPU 206 obtains the registration device information registered in the device management server 400 and lists the registration device information on the screen 700*b*. In step S1101, the device management server 400 transmits only the registration device information registered by the user executing this flowchart to the terminal apparatus 200. However, the registration device information for the device management server 400 to transmit may be changed based on other conditions.

In step S1102, the terminal apparatus 200 receives the input of a group name into the group name field 704 displayed on the screen 700b from the user. The user selects one or more connected devices 500 to be grouped.

In step S1103, the terminal apparatus 200 receives the selection of the registration button 707 displayed on the screen 700b by the user. In such a manner, the terminal apparatus 200 receives the operations of grouping the connected device(s) 500.

In step S1104, the CPU 206 transmits the group information to the device management server 400 via the communication unit 205.

Figure 12:
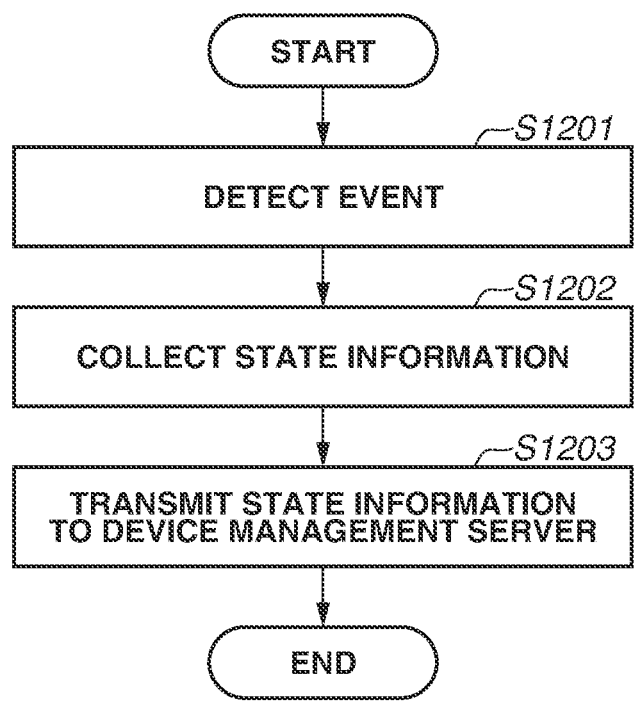
FIG. 12 is a notification processing flowchart of a multifunction peripheral (MFP) according to the present exemplary embodiment.

FIG. 12 is a flowchart in which the MFP 1 (500a) transmits state information to the device management server 400. Each of the operations (steps) of the flowchart is performed by the CPU 501a reading a control program stored in the ROM 502a or the storage 504a into the RAM 503a.

In step S1201, the CPU 501a detects an event. Examples of the event include the completion of a copy or FAX job having been executed by the MFP 1 (500a), that the remaining level of the toner or printing sheets falls below a predetermined threshold, and the occurrence of a failure. A state information transmission instruction from the device management server 400 is also included in the events.

In step S1202, the CPU 501a collects state information to be transmitted to the device management server 400. The CPU 501a collects the operating status of the MFP 1 (500a), setting information, error information, and the type of event as the state information. The information to be collected may vary depending on the event. For example, if the event is the completion of a job, the CPU 501a may collect the type of job which has been completed, a date and time of completion, and a job result thereof may be collected. If the event is the occurrence of a failure, information about the failure location and the date and time of the failure may be collected.

In step S1203, the CPU 501a controls the communication unit 508a so that the communication unit 508a transmits the collected state information to the device management server 400.

Figure 13:
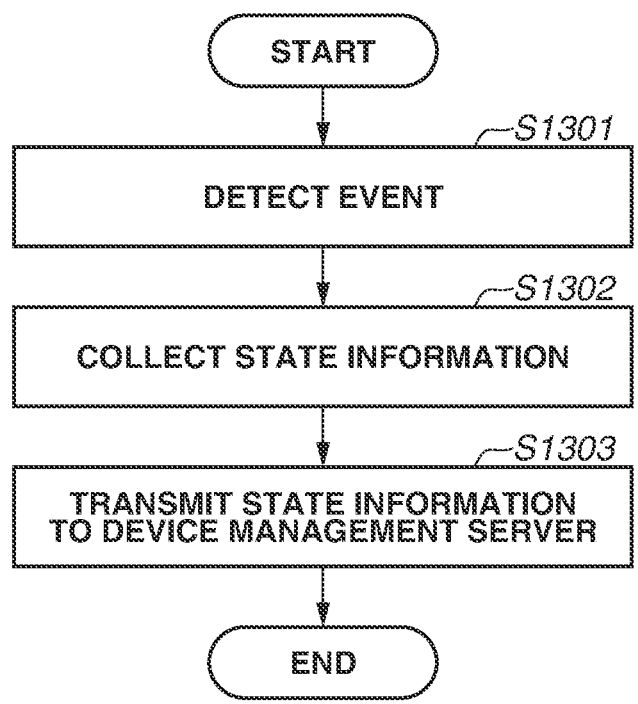
FIG. 13 is a notification processing flowchart of a printer according to the present exemplary embodiment.

FIG. 13 is a flowchart where the printer 500c transmits state information to the device management server 400. Each of the operations (steps) of the flowchart is performed by the CPU 501c reading a control program stored in the ROM 502c or the storage 504c into the RAM 503c.

In step S1301, the CPU 501c detects an event. Examples of the event include the completion of a print job having been executed by the printer 500c, that the remaining level of the toner or printing sheets falls below a predetermined threshold, and the occurrence of a failure. A state information transmission instruction from the device management server 400 is also included in the events.

In step S1302, the CPU 501c collects state information to be transmitted to the device management server 400. The CPU 501c collects the operating status of the printer 500c, setting information, error information, and the type of event as the state information. The information to be collected may vary depending on the event. For example, if the event is the completion of a job, the CPU 501c may collect the type of job completed, the date and time of completion, and a job result. If the event is the occurrence of a failure, information about the failure location and the date and time of the failure may be collected.

In step S1303, the CPU 501c controls the communication unit 507c to transmit the collected state information to the device management server 400.

Figure 14:
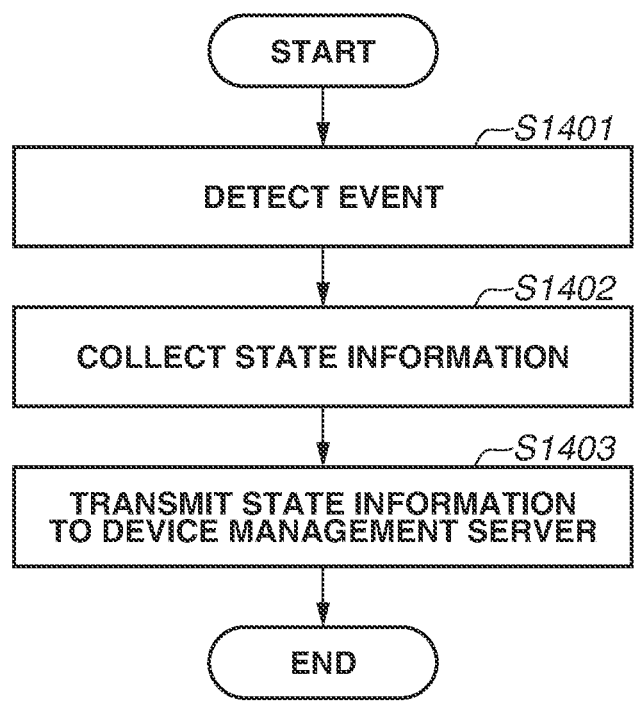
FIG. 14 is a notification processing flowchart of a washing machine according to the present exemplary embodiment.

FIG. 14 is a flowchart where the washing machine 500d transmits state information to the device management server 400. Each of the operations (steps) of the flowchart is performed by the CPU 501d reading a control program stored in the ROM 502d into the RAM 503d.

In step S1401, the CPU 501d detects an event. Examples of the event include the completion of washing, the detection of a failure to continue operation due to a lack of water supply or an open lid, and the occurrence of a breakdown. A state information transmission instruction from the device management server 400 is also included in the events.

In step S1402, the CPU 501d collects state information to be transmitted to the device management server 400. The CPU 501d collects the operating status of the washing machine 500d, setting information, error information, and the type of event as the state information. The information to be collected may vary depending on the event. For example, if the event is the completion of washing, the date and time of completion may be collected. If the event is the occurrence of a breakdown, information about the breakdown location and the date and time of breakdown may be collected.

In step S1403, the CPU 501d controls the communication unit 507d to transmit the collected state information to the device management server 400.

Figure 15:
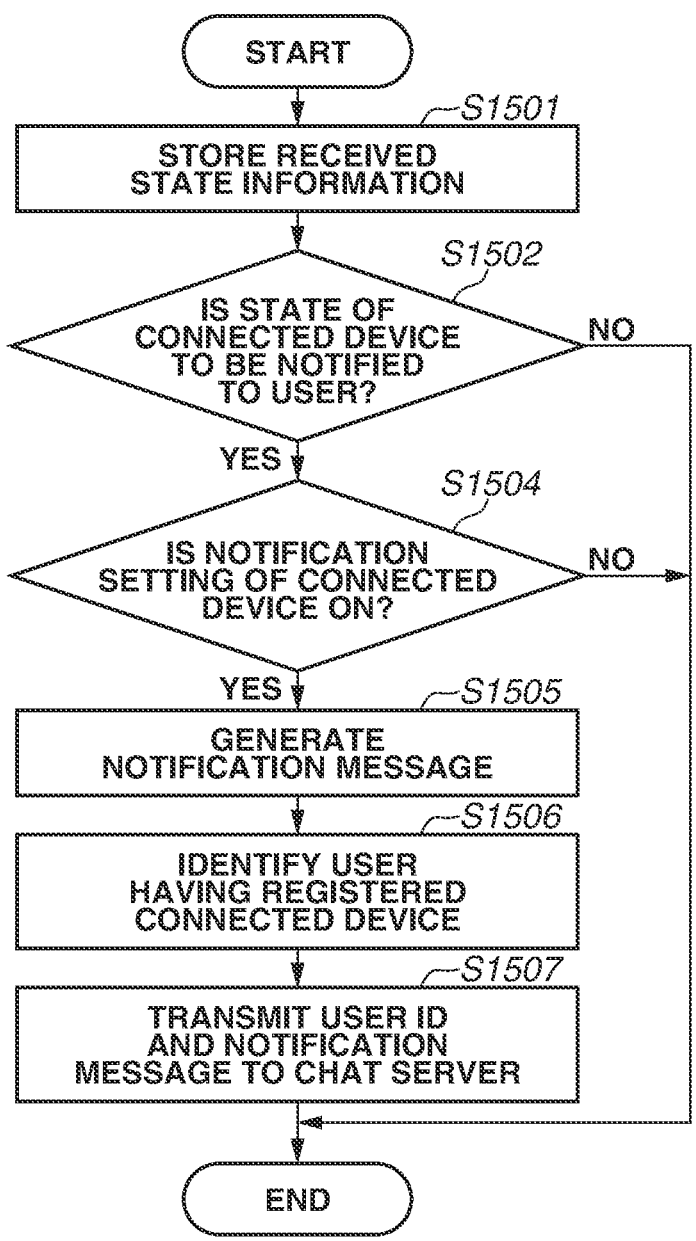
FIG. 15 is a notification processing flowchart of the device management server according to the present exemplary embodiment.

FIG. 15 is a flowchart where the device management server 400 posts a notification regarding state information obtained from a connected device 500 to the chat server 300. Each of the operations (steps) of the flowchart is performed by the CPU 403 reading a control program stored in the ROM 404 or the HDD 402 into the RAM 405.

In step S1501, the CPU 403 stores state information received by the communication unit 401 into the HDD 402.

In step S1502, the CPU 403 analyzes the state information received in step S1501 and determines whether the state of the connected device 500 is to be notified to the user. Examples of the state to be notified include a case where the completion of processing having been executed by the connected device 500 or the detection of a failure of the connected device 500 is included in the state information. Notification conditions to be used in determining whether to notify the user of the state of the connected device 500 are stored in the HDD 402 of the device management server 400 in advance. The notification conditions may be settable by the user on an individual device 500 basis. For example, if the "completion of printing of a received FAX document" is set as a notification condition of the MFP 1 (500a) and the CPU 403 determines that the type of event indicating the completion of printing of a received FAX document is included in the state information, the CPU 403 determines to notify the user of the state of the connected device 500. If the CPU 403 determines that the state of the connected device 500 is to be notified (YES in step S1502) based on a result of the analysis, the processing proceeds to step S1503. If the CPU 403 determines that the state of the connected device 500 is not to be notified (NO in step S1502), this flowchart is ended.

In step S1504, the CPU 403 obtains the notification setting of the connected device 500 of which the state is determined to be notified in step S1502. If the notification setting is on (YES in step S1504), the processing proceeds to step S1505. If the notification setting is off (NO in step S1504), this flowchart is ended. While in step S1504 the processing branches depending on the notification setting itself of the connected device 500 of which the state is determined to be notified, the processing may branch based on the attendance management service association setting.

In step S1505, the CPU 403 generates a notification message. The notification message is generated based on the state information. The notification message may be generated using a format determined for each type of event in advance. A fixed message set by the user may be used. The notification message may include information such as the name, type, and icon of the connected device 500.

In step S1506, the CPU 403 searches the registration device information stored in the HDD 402 for the user information about the user having registered the connected device 500 of which the state is determined to be notified in step S1502.

In step S1507, the CPU 403 transmits the user ID and the notification message to the chat server 300 so that the user identified in step S1506 is notified of the notification message generated in step S1505.

Figure 16:
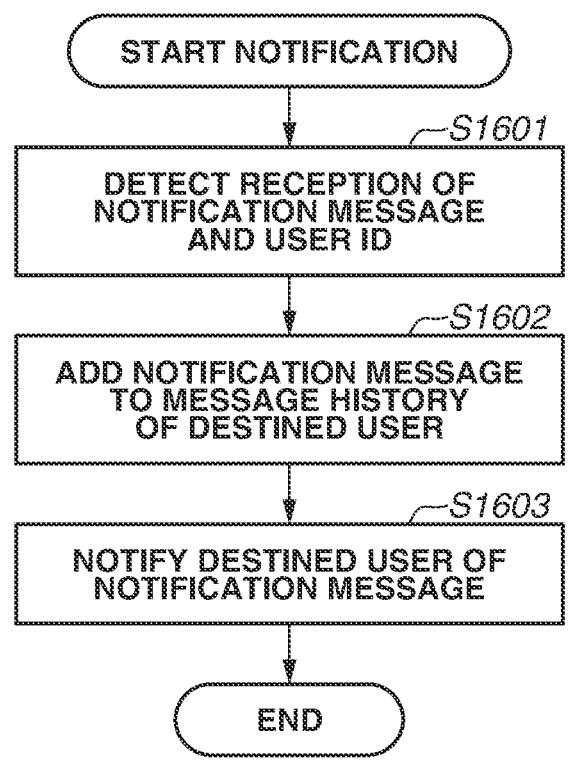
FIG. 16 is a notification processing flowchart of a chat server according to the present exemplary embodiment.

FIG. 16 is a flowchart where the chat server 300 notifies the terminal apparatus 200 of a notification message transmitted from the device management server 400. Each of the operations (steps) of the flowchart is performed by the CPU 304 reading a control program stored in the ROM 305 or the HDD 302 into the RAM 306.

In step S1601, the CPU 304 detects the reception of the notification message and the user ID, or destination, transmitted from the device management server 400 via the communication unit 301.

In step S1602, the CPU 304 stores the notification message received in step S1601 into a message history of the destined user. The user can retrospectively check notification messages stored in the message history.

In step S1603, the CPU 304 notifies the destined user of the notification message received in step S1601. In the present exemplary embodiment, the CPU 304 notifies the terminal apparatus 200 of the notification message via a not-illustrated distribution server for issuing push notifications by transmitting the notification message and the ID of the terminal apparatus 200 owned by the user to the distribution server.

Figure 17:
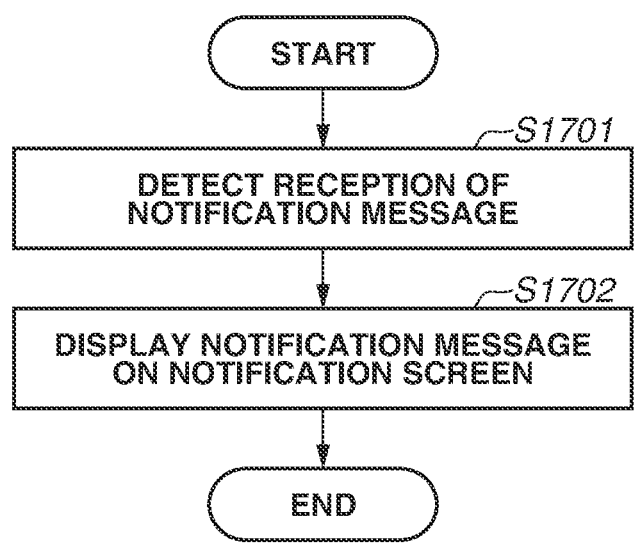
FIG. 17 is a notification display processing flowchart of the terminal apparatus according to the present exemplary embodiment.

FIG. 17 is a flowchart where the terminal apparatus 200 displays a notification message notified from the chat server 300. Each of the operations (steps) of the flowchart is performed by the CPU 206 reading a control program stored in the ROM 207 or the storage 209 into the RAM 208.

In step S1701, the CPU 206 detects the reception of a notification message notified from the chat server 300 by the communication unit 205.

In step S1702, the CPU 206 displays the notification message received in step S1701 on the notification screen 900.

In the present exemplary embodiment, the device management server 400 is described to determine in step S1504 whether to generate a notification message in step S1505. However, the present exemplary embodiment is not limited thereto. For example, step S1504 may be omitted and a notification massage may always be generated and posted to the chat server 300 in steps S1505 to S1507 along with the following control. The terminal apparatus 200 may switch whether to access the chat server 300 and display the notification message on the notification screen 900 based on the attendance management service association setting or the notification setting of the connected device 500. In such a case, the chat server 300 only adds the notification message to the message history in step S1602 without transmitting the notification message to the distribution server. The terminal apparatus 200 then determines whether to display the notification message at timing when the message history is obtained from the chat server 300.

Alternatively, for example, step S1504 may be omitted and a notification message may always be generated and posted to the chat server 300 in steps S1505 to S1507 along with the following control. The device management server 400 may determine whether to transmit the notification message and the ID of the terminal apparatus 200 owned by the user to the not-illustrated distribution server for issuing push notifications based on the notification setting of the connected device 500 about which the state information is transmitted. If the notification setting of the connected device 500 is enabled, the device management server 400 instructs the chat server 300 to transmit the notification message and the ID of the terminal apparatus 200 owned by the user to the not-illustrated distribution server for issuing push notifications. The terminal apparatus 200 can thereby issue a notification on the lock screen without receiving the user's notification display instruction. On the other hand, if the notification setting of the connected device 500 is disabled, the device management server 400 instructs the chat server 300 to not transmit the notification message or the ID of the terminal apparatus 200 owned by the user to the not-illustrated distribution server for issuing push notifications. In such a case, the terminal apparatus 200 does not need to issue a notification on the lock screen.

As described above, one or more connected devices 500 can be registered in a group, and the settings about notifications on the operation unit 201 of the terminal apparatus 200 based on information from a plurality of devices belonging to a plurality of groups can be collectively changed in association with the attendance management service.

According to the exemplary embodiment described above, whether to notify the user of information from the connected devices 500 can be changed based on the state of the user. For example, suppose that the user wants to receive FAX reception notifications and error notifications from the devices installed in the office only when in the office. In such a case, the user does not need to repeat the operations of switching the notification settings of the devices installed in the office on when entering the office, and switching the notification settings of the devices off when leaving the office.

Suppose that notifications are set to be received with the detection of opening and closing of a refrigerator door and a start of washing by a washing machine as triggers, in order to watch a person when the watcher is absent from home. In such a case, the watcher does not need to repeat the operations of switching the information notifications from the devices on when going out, and switching the information notifications from the devices off when coming home.

More specifically, for example, the user, when leaving the office, can change the notification settings based on the information about the connected devices 500 belonging to the headquarters printer group to off in synchronization with the operation of changing the attendance status to "absent". The user, when coming home, can set the notification settings based on the information about the connected devices 500 belonging to the home appliances group to on in synchronization with the change in the attendance status to "absent". The foregoing exemplary embodiment has been described by using the state "absent" as an example. However, a state "coming home" may be used instead. In such a case, a selection box "coming home" is provided instead of the selection box "absent" 812. In addition, a coming home button is provided instead of the clock-out button 2002. Then, in a state after the pressing of the coming home button where the user is detected to be at home, notifications can be issued based on information received from devices that are set to issue notifications when the user is at home.

The foregoing exemplary embodiment is more effective if the user wants to collectively change the notification settings of a plurality of devices based on the state of the user. Suppose, for example, that the user wants to receive FAX reception notifications and error notifications from a plurality of devices installed in the office only when in the office. In such a case, the plurality of devices is registered as a group, and the group is set to issue notifications when the user is present at the office. The notification settings of the plurality of devices therefore do not need to be switched on one by one when the user enters the office. Moreover, suppose, for example, that the user wants to receive notifications from the home appliances after leaving the office. In such a case, the user does not need to make the operations of enabling the respective notification settings of the study printer 805, the home kitchen rice cooker 815, and the home washing machine 816. Instead, with the attendance management service association setting 813 enabled, the notification settings of the plurality of connected devices 500 registered in the home appliances group can be collectively changed.

Whether the association of each connected device 500 with the attendance management service set on the notification setting screen 800*b* is enabled or disabled may be stored in the chat server 300, and the chat server 300 may determine whether to post the notification messages of the connected devices 500. If the notification setting of a connected device 500 made on the notification setting screen 800*b* is enabled, the chat server 300 stores that the notification setting of the connected device 500 is enabled. When a notification of the state information about the connected device 500 is issued, the chat server 300 posts a notification message based on the notification. On the other hand, if the notification setting of a connected device 500 made on the notification setting screen 800*b* is disabled, the chat server 300 stores that the notification setting of the connected device 500 is disabled. When a notification of the state information about the connected device 500 is issued, the chat server 300 does not post a notification message based on the notification. While the chat server 300 here is described to determine whether to post a notification message, the chat server 300 may determine whether to issue a push notification of the notification message to the terminal apparatus 200. If the notification setting of a connected device 500 made on the notification setting screen 800*b* is enabled, the chat server 300 stores that the notification setting of the connected device 500 is enabled. When a notification of the state information about the connected device 500 is issued, the chat server 300 transmits the notification message and the ID of the terminal apparatus 200 owned by the user to the not-illustrated distribution server for issuing push notifications. In other words, the chat server 300 automatically displays the notification message on the lock screen or home screen without the user's instruction to display the notification message. On the other hand, if the notification setting of a connected device 500 made on the notification setting screen 800*b* is disabled, the chat server 300 stores that the notification setting of the connected device 500 is disabled. When a notification of the state information about the connected device 500 is issued, the chat server 300 does not transmit the notification message or the ID of the terminal apparatus 200 owned by the user to the non-illustrated distribution server for issuing push notifications. In other words, the chat server 300 does not automatically display the notification message on the lock screen or home screen of the terminal apparatus 200. Using such methods, whether to post a notification message or issue a push notification of the notification message can be easily set based on the settings of the connected devices 500 made by the user via the notification setting screen 800*b*. Moreover, notifications issued during a period when the notification setting of a connected device 500 is disabled may be stored, and the stored notifications may be listed at timing when the notification setting is switched on in response to a change in the attendance status.

The work form field 2005 (see FIG. 20) may be configured so that "telecommuting" and "at office" can be selected. In such a case, the foregoing control is performed if the clock-in button 2001 is selected with "at office" selected. On the other hand, if the clock-in button 2001 is selected with "telecommuting" selected, notifications based on the information from the connected devices 500 may be received from both the connected devices 500 set to issue notifications when the user is present at the office and the connected devices 500 set to issue notifications when the user is absent from the office. This, for example, enables the user at home to receive notifications from both the connected devices 500 installed in the office and those at home.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-012595, filed Jan. 31, 2022, which is hereby incorporated by reference herein in its entirety.

What is claimed is:
1. A system comprising:
at least one processor causes the system to function as:

a reception unit configured to receive information from a device;

a transmission unit configured to transmit the information received by the reception unit to an information terminal of a user;

a detection unit configured to detect an attendance state which is changed by an entering-office operation made by the user and a leaving-office operation made by the user; and a control unit configured to determine whether to enable or disable transmission of the information to the information terminal of the user using the transmission unit based on the attendance state detected by the detection unit; and a setting unit configured to set whether to enable or disable transmission of the information from the device to the information terminal of the user when the user is present at an office, the setting unit further setting whether to enable or disable transmission of the information from the device to the information terminal of the user when the user is absent from the office, wherein the transmission unit is configured to transmit the information to the information terminal of the user in a case where the setting unit sets to enable the transmission of the information from the device to the information terminal of the user when the user is present at the office and the detection unit detects presence of the user at the office, and wherein the transmission unit is configured to transmit the information to the information terminal of the user in a case where the setting unit sets to enable the transmission of the information from the device to the information terminal of the user and the detection unit detects absence of the user from the office.

2. The system according to claim 1,
wherein the reception unit is configured to receive information from a plurality of grouped devices, and
wherein the setting unit is configured to collectively set, for the plurality of grouped devices, whether to transmit the information from the plurality of grouped devices to the information terminal of the user when the user is present at the office.

3. The system according to claim 2, wherein the at least one processor causes the system to further function as an acceptance unit configured to accept an operation of grouping two or more devices into the plurality of devices.

4. The system according to claim 1,
wherein the reception unit is configured to receive information from a plurality of grouped devices, and
wherein the setting unit is configured to collectively set, for the plurality of grouped devices, whether to enable or disable transmission of the information from the plurality of grouped devices to the information terminal of the user when the user is absent from the office.

5. The system according to claim 4, wherein the at least one processor causes the system to further function as an acceptance unit configured to accept an operation of grouping two or more devices into the plurality of devices.

6. The system according to claim 1, wherein the at least one processor causes the system to further function as an input unit configured to input the user entering an office, wherein the detection unit is configured to detect the attendance state of the user based on the input by the input unit.

7. The system according to claim 6, further comprising a mobile terminal,
wherein the mobile terminal includes the input unit.

8. The system according to claim 1, wherein the device is a multifunction peripheral, a printer, or a washing machine.

9. A non-transitory computer-readable storage medium storing a program for causing a mobile terminal included in a system to perform processing, the system including a reception unit configured to receive information from a device and a transmission unit configured to transmit the information received by the reception unit to an information terminal of a user, the processing comprising:

receiving a notification issued based on an attendance state which is changed by an entering-office operation made by the user and a leaving-office operation made by the user;

issuing a notification based on the received notification;

setting whether to enable or disable transmission of the information from the device to the information terminal of the user when the user is present at an office; and setting whether to enable or disable transmission of the information from the device to the information terminal of the user when the user is absent from the office.

10. The non-transitory computer-readable storage medium according to claim 9,
wherein the reception unit is configured to receive information from a plurality of grouped devices, and
wherein whether to enable or disable transmission of the information from the plurality of grouped devices to the information terminal of the user when the user is present at the office is collectively set for the plurality of grouped device.

11. The storage medium according to claim 10, the processing further comprising accepting an operation of grouping two or more devices into the plurality of devices.

12. The non-transitory computer-readable storage medium according to claim 9,
wherein the reception unit is configured to receive information from a plurality of grouped devices, and
wherein whether to enable or disable transmission of the information from the plurality of grouped devices to the information terminal of the user when the user is absent from the office is collectively set for the plurality of grouped devices.

13. The non-transitory computer-readable storage medium according to claim 12, the processing further comprising accepting an operation of grouping two or more devices into the plurality of devices.

14. The non-transitory computer-readable storage medium according to claim 9, the processing further comprising inputting the user entering an office,
wherein the attendance state of the user is detected based on the input.

15. The non-transitory computer-readable storage medium according to claim 9, wherein the device is a multifunction peripheral, a printer, or a washing machine.

* * * * *